United States Patent
Eldada et al.

(10) Patent No.: US 7,088,892 B2
(45) Date of Patent: Aug. 8, 2006

(54) NORMALLY DARK Y-BRANCH DIGITAL OPTICAL SWITCHES AND VARIABLE OPTICAL ATTENUATORS

(75) Inventors: Louay Eldada, Lexington, MA (US); Junichiro Fujita, Boston, MA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 25 days.

(21) Appl. No.: 10/933,597

(22) Filed: Sep. 2, 2004

(65) Prior Publication Data

US 2006/0045424 A1    Mar. 2, 2006

(51) Int. Cl.
    G02B 6/35    (2006.01)
    G02B 6/42    (2006.01)

(52) U.S. Cl. .................. 385/45; 385/40; 385/140; 385/15; 385/16; 385/14; 385/129; 385/130

(58) Field of Classification Search .............. 385/14, 385/15, 16, 140, 45, 40, 39, 9, 41, 42, 129, 385/130, 131
See application file for complete search history.

(56) References Cited

U.S. PATENT DOCUMENTS

| | | | | |
|---|---|---|---|---|
| 5,303,315 | A * | 4/1994 | Granestrand | 385/16 |
| 5,623,566 | A | 4/1997 | Lee et al. | 385/24 |
| 6,233,377 | B1 * | 5/2001 | Keil et al. | 385/16 |
| 6,236,774 | B1 | 5/2001 | Lackritz et al. | 385/14 |
| 2004/0071386 | A1 | 4/2004 | Numen et al. | 385/14 |
| 2006/0045424 | A1 * | 3/2006 | Eldada et al. | 385/45 |

FOREIGN PATENT DOCUMENTS

| | | | | |
|---|---|---|---|---|
| WO | WO 96/33441 | 10/1996 | | 385/14 X |
| WO | WO 01/53888 A2 | 7/2001 | | 385/14 X |

OTHER PUBLICATIONS

Kaname Jinguji et al., Two-Port Optical Wavelength Circuits Composed of Cascaded Mach-Zehnder Interferometers with Point-Symmetrical Configurations, Journal of Lightwave Technology, vol. 14(10):2301-2310, Oct. 1996.

Yasuhiro Hida et al., Polymer Waveguide Themooptic Switch with Low Electric Power Consumption at 1.3 um, IEEE Photonics Technology Letters, vol. 5(7):782-784, 1993.

Louay Eldada et al., Polymeric components for all-optical networks, Proc. SPIE, vol. 3950:78-89, 2000

Sang-Shin Lee et al., Polymeric Tunable Optical Attenuator with an Optical Monitoring Tap for WDM Transmission Network, IEEE Photonics Technology Letters, vol. 11(5):590-592, 1999.

Tamir et al., Guided Wave Optoelectronics, Springer-Verlag, 1988, pp. 121-125.

Mart B.J. Diemeer, Polymeric thermo-optic space switches for optical communications, Optical Materials, vol. 9:192-200, 1998.

(Continued)

*Primary Examiner*—Brian Healy

(57) ABSTRACT

The present invention is directed to Y-branch digital optical switching and optical attenuator devices, which enhance the security of optical communications channels in the event of an electrical power loss.

20 Claims, 4 Drawing Sheets

(a)

(b)

OTHER PUBLICATIONS

R. Moosburger et al., A novel polymer digital optical switch with high temperature stability, ECOC, vol. 21:1063-1067, 1995.

Bernhard W., et al., "Crosstalk reduction in switching networks by asymmetrical off-on swithces", Proceedings of the SPIE Conference on Integrated Optics Devices, Jan. 1999, vol. 3620.

* cited by examiner (c)

NORMALLY DARK Y-BRANCH DIGITAL OPTICAL SWITCHES AND VARIABLE OPTICAL ATTENTUATORS

FIELD OF THE INVENTION

The present invention is directed to switching devices which enhance the security of optical communications channels in the event of an electrical power loss, and, more broadly, to the field of switching in optical communications signal processors.

BACKGROUND OF THE INVENTION

Digital optical spatial switches (DOS) are well known in the art. One class of such switches is the 1×2 digital optical switch known as a "Y-branch digital optical switch" (DOS) wherein light input into the "base" or trunk of the Y is directed through one or the other of the output branches by virtue of changes effected in the refractive index of one or both of the output branches. The switch can also be operated in reverse, whereby one or the other "upper branches" of the Y can be selected as an input channel with the base of the Y being the output channel. Y-branches are a fundamental building block of optical circuitry, and may be employed singly, or in various combinations to form more complex switching and coupling devices.

The Y-branch DOS has received wide commercial acceptance primarily because of its robustness to variations in critical parameters such as electrical power applied, polarization, wavelength, temperature, and to a large extent, even device geometrical variations. Typically a Y-branch DOS is designed such that two waveguide branches intersect to define a Y-shaped structure with a very small angle at the intersection of the branches. The composition of the waveguide structure may include a wide variety of materials such as lithium niobate, semiconductors, silica, or polymers. A Y-branch DOS performs its switching function by adiabatically changing (i.e. slowly varying, as opposed to abruptly altering) the light propagation direction in one of the output waveguides.

Specifically, switching in a Y-branch DOS is achieved by forcing a refractive index change in one waveguide branch with respect to the other. Of particular significance among the characteristics of a Y-branch DOS is its step-like response. When a Y-branch DOS operates above a switching threshold, variations in polarization and wavelength do not impact significantly the switching capacity of the Y-branch DOS.

One persistent problem presented to the designer of optical communications systems is related to the security of the data transmission in the event of an electrical power failure. Numerous optical communications components are electro-optic in nature. When an electrical power failure occurs optical data signals could potentially be misdirected. It is important to provide a fail-safe mechanism by which secure optical transmissions are not inadvertently diverted to the wrong recipient during a power failure. This can be achieved by placing in line a normally dark digital optical switch (ND-DOS), or its variant, a normally dark variable optical attenuator (ND-VOA). The ND feature also helps avoid high optical power, which could destroy photodetectors. The ND feature also permits optical power to be shut off without the expenditure of electrical power.

The ND feature is readily available in optomechanical switches and microelectromechanical system switches/VOA's). The challenge of attaining desired levels of signal attenuation in planar light wave circuits (PLCs) is particularly daunting because of the close proximity of optical circuit elements and the high incidence of cross-talk. Signal attenuation of ≧40 dB is needed for the most critical applications. One approach taught in the art to providing a ND feature in PLCs is to use an interferometric design, such as the well-known Mach-Zehnder Interferometer (MZI) as in Jinguji et al, IEEE J Lightwave Technology 14 (10), 2301–2310 (1996). However, available devices exhibit ~20 dB attenuation with high wavelength dependence. While these devices are suitable for some applications, improvements are needed.

Switching in Y-branches is accomplished by effecting a change in refractive index in one of the branches. Several methods are known in the art for effecting the desired change in refractive index. These include the electro-optic effect, the stress-optic effect and the thermo-optic effect. In a typical Y-branch thermo-optic DOS known in the art, the two upper branches of the "Y" are provided with a heating means, typically a thin layer of metal deposited thereupon, which heating means when activated induces a shift in the refractive index of the corresponding branch, thereby effecting a coupling of power input to the base of the "Y" to one or the other branches. By turning on the heating of one branch and turning off the heating of the other branch, switching of incoming optical signals can be effected. By heating both branches at once a gradual signal attenuation may be effected.

Both polymeric and glass Y-branches are known. Because of the much larger temperature dependence of the refractive index of polymers, polymers are preferred for use in thermo-optic digital optical switches.

Hida et al, IEEE Photonics Technology Letters 5 (7), 782–784 (1997), disclose polymeric 2×2 thermo-optic switches consisting of two coupled Y-branches fabricated from deuterated and fluoro-deuterated methacrylate polymers. The method of fabrication involves spin coating polymer solutions onto a silicon substrate followed by forming the Y-shaped components by conventional photolithography, the core ridges being subsequently formed by reactive ion etching. Chromium thin-film strip heaters were formed on the upper Y-branches by electron beam evaporation and wet etching. Separation of the arms was 250 micrometers. The Cr heater strips were 5 mm long and 50 micrometers wide.

Eldada et al, Proc. SPIE, vol. 3950, pp. 78–89 (2000), discloses 1×2 optical switches fabricated from polymeric materials, which Y-branches exhibit 0.1 dB insertion loss for vertex angles of less than 2°. The direct photolithographic fabrication method using halogenated acrylates as practiced therein is disclosed to enable sharp profiles of the components and the removal of residue even at the vertex of relatively small angle Y-branches.

Lackritz et al, U.S. Pat. No. 6,236,774B1, discloses thermo-optic switches employing cross-linked polymeric waveguides operated above $T_g$. Disclosed are metallic heaters substantially rectangular in shape disposed upon a polymeric optical waveguide surface, the long side of said rectangular heater being positioned at a slight angle to the direction of propagation in the waveguide. Said heaters are positioned to be in uniform thermal contact with waveguide material over the entire area of the heater. It is disclosed that the temperature, and therefore the refractive index, of the polymer waveguide material will depend upon the distance of any point therein from the heater, those regions closest to the heater experiencing greater temperature than those further away.

Lee et al, U.S. Pat. No. 5,623,566, is drawn to thermally induced guides in silicon optical benches. Disclosed in FIG. 2 thereof is the temperature profile through the various optical materials employed therein as a result of localized heating applied thereto.

Moosburger et al, Proc. $21^{st}$ Eur. Conf. on Opt. Comm, pp. 1063–1067 (1995) disclose Y-branches with "near perfect" vertices having an angle of 0.12° fabricated from silica-clad polymeric waveguides having cores of ca. 9 micrometers. The upper branches of the Y were coated with Ti thin film heaters. 27 dB cross-talk suppression was achieved between output branches with heater power of ca. 180 mW.

Diemeer, Optical Materials 9, 192–200 (1998) provides a thoroughgoing analysis of the thermal transport and physical aspects of thermo-optic switching in polymeric vs. silica thermo-optic digital optical switches. For polymers in general, and polycarbonate and polymethylmethacrylate in particular, it is shown that switching power lies in the range of 50–100 mW, and that a temperature rise of ca. 10° C. in the waveguide core is necessary to achieve a minimum refractive index difference of ca. 0.001.

Lee et al., IEEE Photonics Technology Letters, 11 (5), 1999, pp. 590–592 discloses a polymeric tunable optical attenuator fabricated using asymmetric DOS/VOA waveguides integrated with an optical monitoring tap, where the attenuation level is minimal when no electrical power is applied.

Tamir et al., *Guided Wave Optoelectronics*, Springer-Verlag, 1988 pp. 121–125 discloses asymmetric Y-branch waveguides for use as mode splitters and power dividers.

SUMMARY OF THE INVENTION

The present invention provides a Y-branch normally dark digital optical switch or normally dark variable optical attenuator (ND-DOS/VOA) comprising an input waveguide segment, an output waveguide segment, an exhaust waveguide segment, a transition waveguide segment, a heater disposed proximate to said transition waveguide segment and said output waveguide segment;

said transition segment being disposed between said input waveguide segment, and said output and exhaust waveguide segments;

said output waveguide segment and said exhaust waveguide segment being divergingly disposed with respect to said transition waveguide segment; said output waveguide segment being of a width and height that is within −50% to +100% of the width and height, respectively, of said input waveguide segment; said transition waveguide segment being geometrically asymmetric with respect to the longitudinal axis of said input waveguide segment; said exhaust waveguide segment and said output waveguide segment being characterized by a width ratio of at least 2:1;

wherein said input, output, exhaust, and transition waveguide segments comprise an organic polymer or silica; and with the proviso that said Y-branch ND-DOS/VOA further comprises a lateral displacement between said heating means and said output waveguide segment when said input, output, exhaust, and transition waveguide segments comprise an organic polymer.

BRIEF DESCRIPTION OF THE DRAWINGS

FIG. 1(*b*) depicts a cross sectional view of the transition waveguide segment of the embodiment depicted in FIG. 1(*a*).

FIG. 1(*c*) depicts the same embodiment as that in FIG. 1(*a*), showing the parameters employed to characterize the asymmetry of the transition waveguide segment.

DETAILED DESCRIPTION

Figure 1:
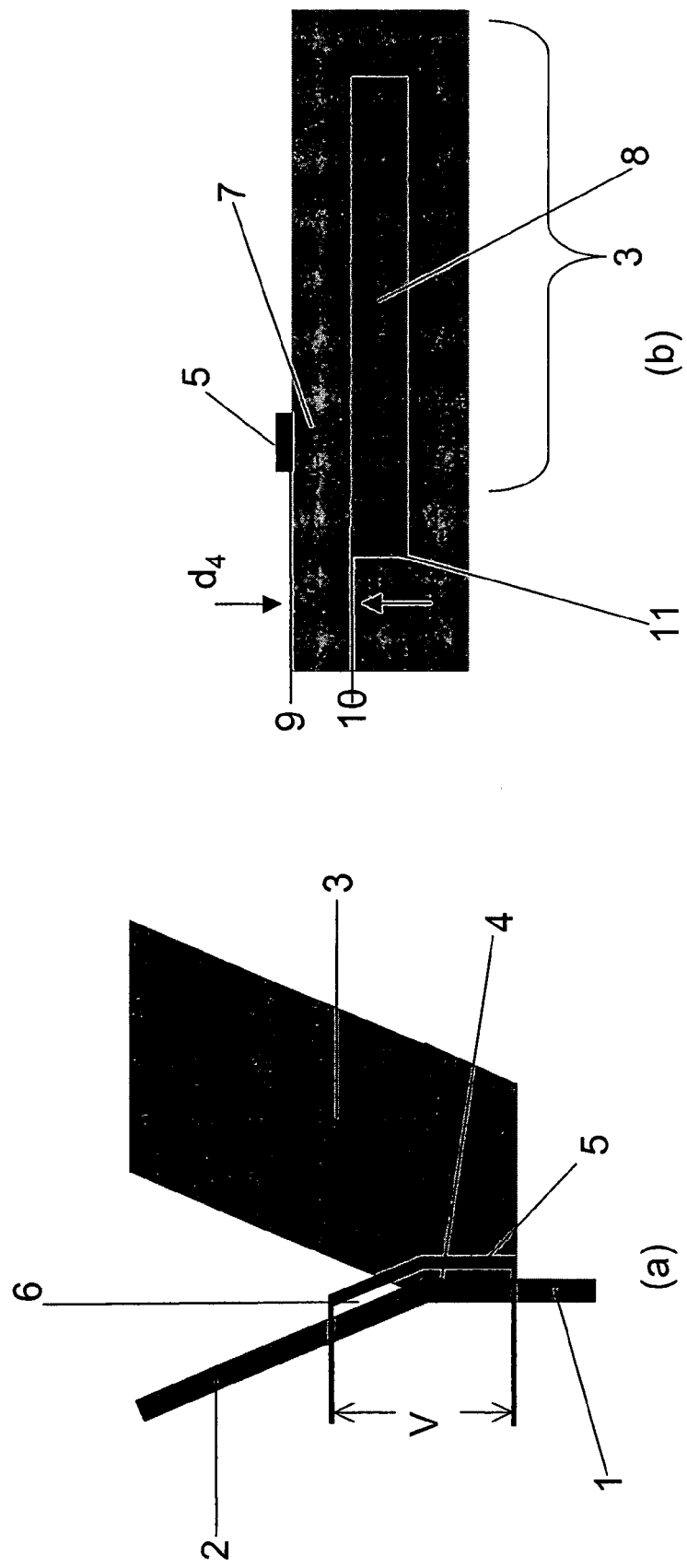
FIG. 1(*a*) depicts one embodiment of the ND-DOS/VOA of the invention comprising a waveguide material with a negative thermo-optic coefficient, showing the a top-down view with the schematic arrangement of components.
Figure 1:
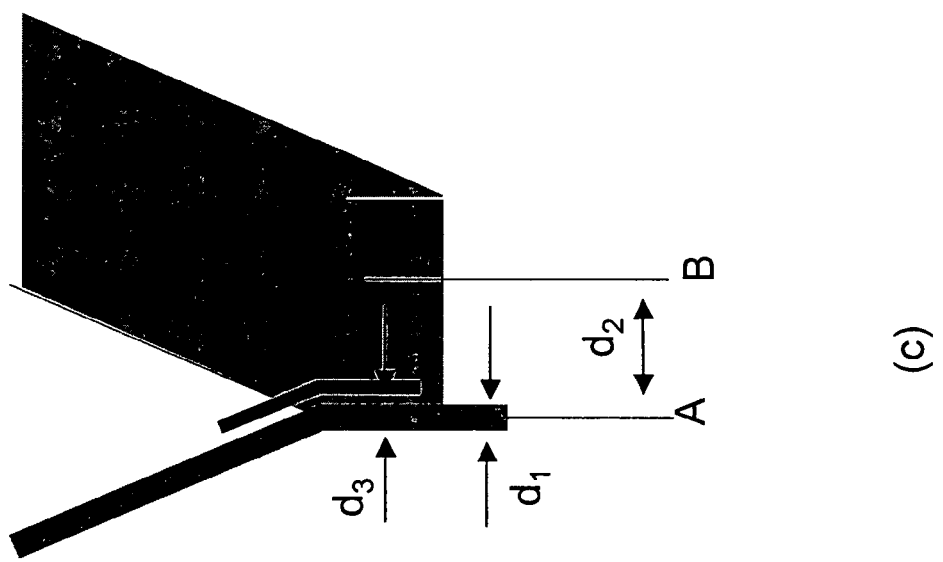

For the purposes of the present invention a "normally dark (ND) digital optical switch (DOS)" is an electrically-controlled optical signal device that prevents transmission of an optical signal when electrical power is lost, and permits transmission thereof when electrical power above some predetermined threshold is applied. A "normally dark variable optical attenuator (VOA)" is an electrically controlled optical signal device, which, in addition to performing the VOA function, prevents transmission of an optical signal when electrical power is lost.

Since the key elements of the invention apply equally to a Y-branch DOS and a Y-branch VOA, the term "ND-DOS/VOA" will be employed and shall be understood by the practitioner hereof to refer to both a normally dark Y-branch digital optical switch or a normally dark Y-branch variable optical attenuator with the understanding that the DOS and VOA differ in regard to method of use rather than in the elements of the present invention which pertain to either one. In those cases in which it is desired to refer expressly to a DOS or a VOA, each will be so referred to explicitly.

Unless otherwise stated, the term "attenuation" shall be understood to refer to the reduction in optical signal power in the output segment of the ND-DOS/VOA of the invention when no electrical signal is applied thereto, such as, but exclusively, when electrical power is lost.

For the purposes of the present invention the term "width ratio" shall be employed to refer to the ratio of the maximum width of the exhaust waveguide segment to the width of the output waveguide segment. Thus, for example, a width ratio of 5:1 means that the maximum width of the exhaust waveguide segment is five times greater than the width of the output waveguide segment.

According to the present invention, a ND-DOS/VOA is provided having attenuation of at least 10 dB, preferably at least 20 dB, most preferably at least 40 dB. At the core of the invention is a geometrically asymmetric Y-branch optical wave guiding element that achieves the ND-DOS/VOA functionality by acting as an ON/OFF switch that is in the OFF (blocking) mode when no electrical power is applied, and, in the case of the ND-DOS of the invention, in the ON (transmission) mode when an electrical signal above a predetermined threshold power level is applied to at least one thermo-optic and/or electro-optic switching electrode positioned in proximity to the ND-DOS/VOA. In the "ON" state, light directed into the input segment of the Y-branch is guided through the transition segment into the output segment, thereby permitting continued transmission of the optical signal. In the "OFF" state, the optical signal is guided through the transition segment into the exhaust segment, the power reduction in the output segment being at least −10 dB, preferably at least −20 dB, most preferably −40 dB. That is to say that the insertion loss of the ND-DOS/VOA becomes very high. The asymmetric Y-branch ND-DOS/VOA of the present invention can be placed in any PLC to block optical signal transmission upon removal of electrical power applied thereto.

In the case of the ND-VOA of the invention, the protocol herein above recited for the ND-DOS is modified in that the electrical power applied to the heater is intermediate between the threshold power level for the "ON" state and the unpowered "OFF" state.

Referring to FIG. 1(a), which depicts one embodiment of the ND-DOS/VOA of the invention comprising a waveguide material with a negative thermo-optic coefficient, the present invention provides a ND-DOS/VOA comprising an input waveguide segment, 1, an output waveguide segment, 2, an exhaust waveguide segment, 3, a transition waveguide segment, 4, a heater, 5, disposed at the top of the left edge of the exhaust waveguide component of the transition segment, 4, and which follows the inner edge of the output waveguide segment but is not in contact therewith, being both above it and separated laterally by a gap there from, 6. While FIG. 1a depicts the heater as exactly tracing the inner edge of the output waveguide, it may digress somewhat from the exact path depicted. The transition waveguide segment is disposed between the input waveguide segment, 1, and the output and exhaust waveguide segments, 2 and 3, the output waveguide segment and the exhaust waveguide segment being divergingly disposed with respect to said transition waveguide segment, the output waveguide segment being of width and height that are within −50% and +100% of said input waveguide segment, said transition waveguide segment being geometrically asymmetric with respect to the longitudinal axis of said input waveguide segment and the width ratio being greater than 2:1.

FIG. 1(b) depicts a cross sectional view of the transition waveguide segment, 4, showing the heater, 5, positioned on the cladding, 7, directly above the inner section of the core, 8, of the exhaust waveguide segment, 3. Also indicated in FIG. 1(b) is the heater plane 9, and the horizontal edge, 10, of the core, 11, of the output waveguide segment that is closer to the heater plane.

The waveguide segments of the ND-DOS/VOA of the invention may differ in composition and refractive index without detriment to the operability of the present invention. However, from a practical viewpoint, it is preferred that the entire ND-DOS/VOA of the invention be of a single composition. The ND-DOS/VOA of the invention may comprise silica or an organic polymer. Preferably the ND-DOS/VOA of the invention comprises an organic polymer.

The output waveguide segment of the ND-DOS/VOA of the invention is similar in size and shape to the input waveguide segment. The width of the output waveguide segment can range from as much as 50% smaller than the width of the input waveguide segment to as much as 100% larger. However, it is preferred that the output waveguide segment be equal in dimensions to the input waveguide segment.

According to the present invention, the transition waveguide segment is geometrically asymmetrical with respect to the longitudinal axis of the input waveguide segment. The longitudinal axis of the input waveguide segment corresponds to the direction of propagation of the incoming light wave. The level of asymmetry is determined as depicted in FIG. 1c by the lateral shift, d2, between (A) the center of the input waveguide at the end of said input waveguide and (B) the center of the transition segment at the end of said transition segment. According to the present invention, the lateral shift thus measured is at least 3 times, preferably at least 10 times, the width of the input waveguide segment, d1, at the output end of said input waveguide segment.

Further according to the present invention, the width ratio, as defined herein above, is greater than 2:1, preferably at least 5:1, more preferably at least 15:1, and most preferably at least 25:1.

In a typical embodiment, the refractive index of the core and cladding of the waveguide segments of the ND-DOS/VOA of the invention are uniform throughout, the core being ca. 0.5% higher in refractive index than the cladding. In this embodiment, it is found in the practice of the invention that the width ratio should be at least 5:1, preferably at least 15:1, most preferably at least 25:1.

In other embodiments, the refractive index difference between core and cladding may be larger than 0.5%, permitting achievement of satisfactory signal attenuation when the width ratio is as low as 2:1. In addition, were the exhaust waveguide segment fabricated to provide a core thereof with a higher refractive index than that of the output waveguide segment, the width ratio necessary for satisfactory signal attenuation may in certain embodiments hereof be achieved at width ratios between 2:1 and 5:1.

The heating element, shown as 5 in FIG. 1(a), is disposed proximate to said transition waveguide segment, 4, and said output waveguide segment, 2. The heating element is employed to heat the waveguide core in order to induce a refractive index change via the thermo-optic effect.

In the embodiment hereof depicted in FIG. 1, the heating element is disposed such that it is separated from the central axis of the core of the output waveguide segment by at least a distance determined by the mode field diameter of the guided mode when the heater is activated. The heating element is preferably located on the top or on the bottom of the waveguide. The "top of the waveguide" means disposed at a greater distance from the chip substrate than is the waveguide core, while "bottom of the waveguide" means disposed at a lesser distance from the chip substrate than is the waveguide core. Bottom heaters are preferred.

Depending on the sign of the thermo-optic coefficient of the waveguide material, the heater has to be placed in one of the following locations: For waveguide materials having negative thermo-optic coefficients—that is, wherein dn/dT<0, where "n" designates refractive index and "T" temperature, depicted in FIGS. 1(a)–1(c)—such as organic polymers, the heating element is preferably disposed at the top or the bottom of the transition segment along the inner portion of the exhaust waveguide segment, being separated from the outside edge of the output side of the transition segment by distance $d_3$ (in FIG. 1c) that is at least the smaller of the width, $d_2$, of the input or output waveguide segment, but not more than the input or output waveguide width (whichever is smaller) plus 10 times the distance $d_4$ (in FIG. 1(b)) between the heater plane 9, and the waveguide core horizontal edge 10.

Figure 2:
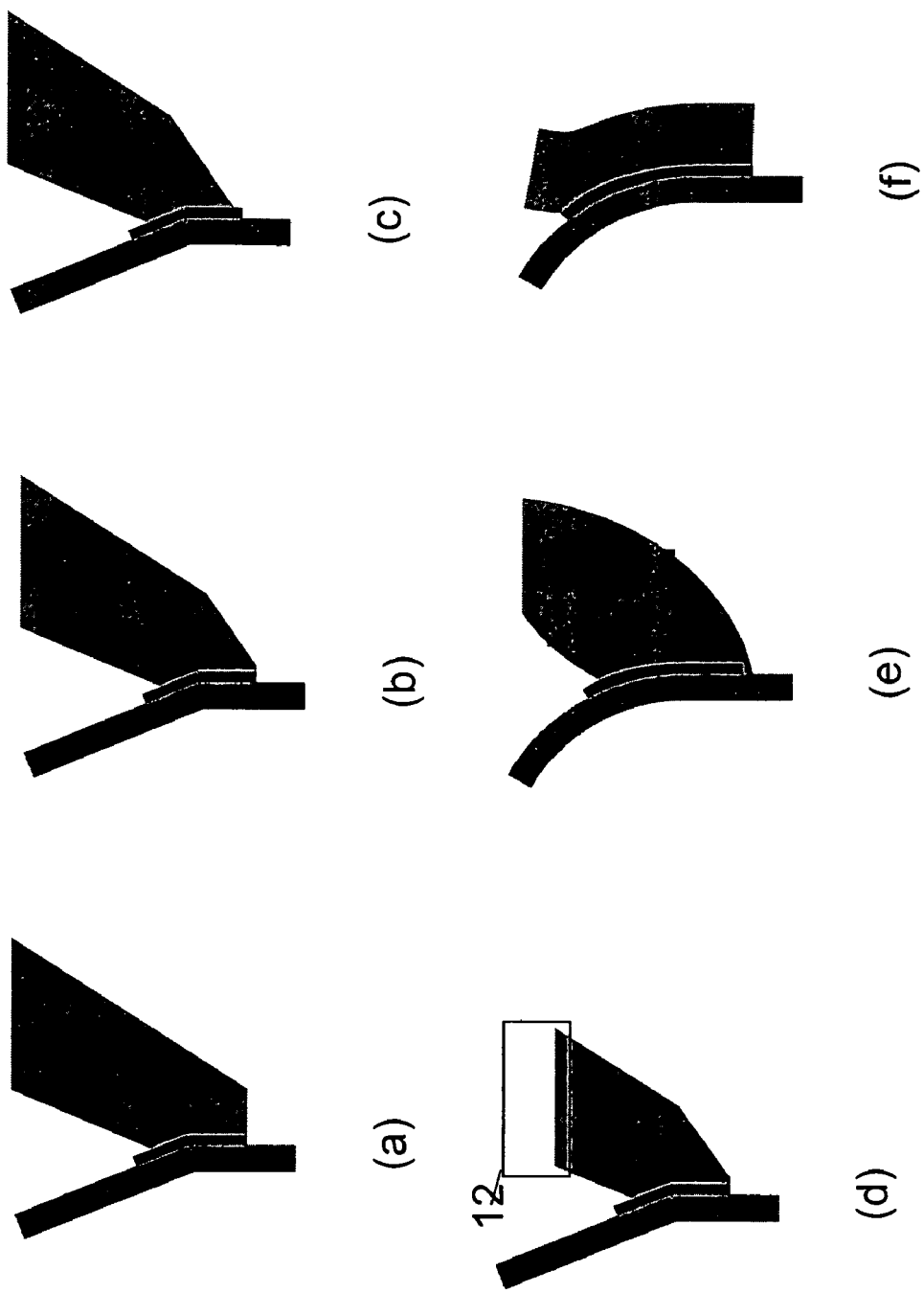
FIGS. 2(*a*)–2(*f*) depict alternative embodiments of the ND-DOS/VOA of the invention comprising a waveguide material with a negative thermo-optic coefficient, showing the top-down view with the schematic arrangement of components.

Alternative embodiments of the invention suitable for use with materials having negative thermo-optic coefficients are shown in FIG. 1 and FIGS. 2(a)–(f). FIG. 1 shows one embodiment of the ND-DOS of the invention wherein the exhaust waveguide segment, in the form of a parallelogram, is more than twice as wide as the output waveguide segment. FIG. 2a depicts an embodiment wherein the width of the exhaust waveguide segment grows linearly and monotonically wider in the direction of propagation. FIG. 2b depicts an embodiment wherein the exhaust waveguide segment is 'clipped' in the transition waveguide segment wherein the light beam does not significantly impinge when it diverges. FIG. 2c depicts a further embodiment of the same sort as that in FIG. 2b but a more extreme case where the clipping starts laterally at the point where the two arms meet. FIG. 2d depicts an embodiment wherein the exhaust waveguide segment ends before the edge of the PLC chip, allowing for termination with a structure such as an angled mirror, 12, that diverts away the light emerging from the exhaust waveguide segment from the PLC toward the substrate or toward the cover medium (usually air or another gas or vacuum). FIGS. 2e and 2f depict further embodiments of the ND-DOS/VOA of the invention wherein the component waveguide segments and the heater that constitute the ND-DOS/VOA of the invention are smoothly curved.

Figure 3:
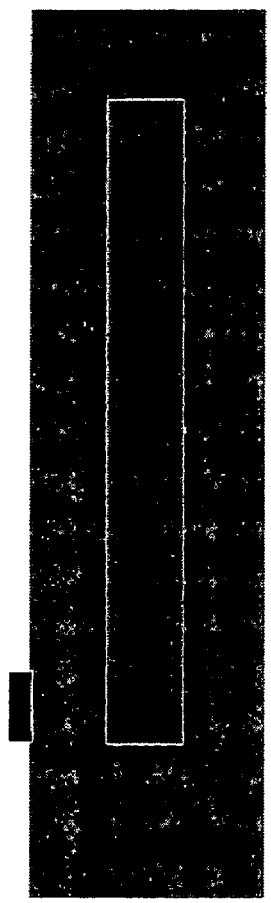
FIG. 3 depicts one embodiment of the ND-DOS/VOA of the invention comprising a waveguide material with a positive thermo-optic coefficient, showing the a top-down view with the schematic arrangement of components.
Figure 3:
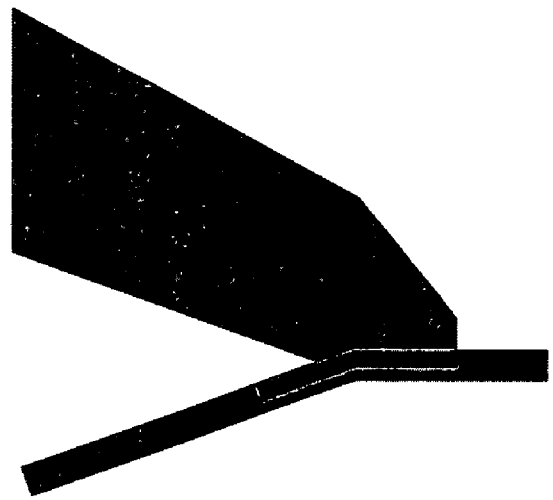

FIG. 3(a) depicts an embodiment of the ND-DOS/VOA of the invention suitable for use with a material characterized by a positive thermo-optic coefficient—that is, dn/dT>0—such as but not limited to silica and silicon. In this embodiment, the heating element is located on the top of the transition waveguide segment, as shown in FIG. 3(b), and it is located laterally inside a width equal to the input/output width (or in between the input and output widths if said widths are not equal) on the output section of the transition segment.

The ND-DOS/VOA of the invention may be prepared according to any of the well-known processes in the art, which are suitable for the preparation of chip-mounted optical waveguides. Particularly beneficial when the ND-DOS/VOA is fabricated from an organic polymer is a direct photolithographic process applied to a suitably transparent photoresistive polymer, as described in L. Eldada, Opt. Eng. 40, 1165 (2001). Because the photoresist polymer itself is utilized to form the waveguide, no reactive ion-etching step is required as in other processes of the art. Reactive ion etching is known to cause striations in waveguide walls, which lead to an aggravation of scattering loss and polarization dependent loss (PDL). Scattering loss and PDL are minimized by employing direct photolithography. The resultant waveguide according to the process taught by Eldada is a graded index polymeric waveguide, which can reduce scattering loss and PDL in the propagating signal.

Other photolithographic methods, which involve reactive ion etching are suitable for the preparation of an ND-DOS/VOA of the present invention comprising silica or doped silica.

It is known in the art that the absolute magnitude of dn/dT for organic polymers exceeds that for inorganic glasses by ca. an order of magnitude. For this reason, organic polymers are highly preferred in the ND-DOS/VOA of the present invention. The organic polymer embodiments hereof are preferred. However, also contemplated within the scope of the present invention are Y-branches made of inorganic materials such as semiconductors and inorganic glasses, especially silica and silicon.

In a typical embodiment hereof, the overall length of the ND-DOS/VOA is in the range of 2.5–5 mm, with the transition waveguide segment being in the range of 1.5–2.5 mm. The core width (looking down from the top) of the input and output waveguide segments are in the range of 5–10 μm, while the core width (looking down from the top) of the transition segment is in the range of 10–200 μm. The refractive index of the exhaust waveguide segment may be equal to that of the output waveguide segment, or may be as much as 0.05 higher. The width ratio required to achieve 40 dB of signal attenuation in the unpowered state decreases as the refractive index difference increases. The width ratio dependence upon refractive index difference increases with increasing length of the transition waveguide segment.

The present invention is operable with any convenient heating means such as is known in the art. This can include induction heating, radiative heating, and electrical resistive heating. From the standpoint of simplicity of implementation, electrical resistive heating is preferred. Electrical resistive heating may be accomplished according to means well known in the art. In one approach, a thin metal strip is sputter coated onto the waveguide using a mask to prepare the heater shape desired. When the heater is not disposed on the surface of the output branch over its entire length, it is deposited on top of that part of the overclad on the chip where there is no core underneath.

Alternatively, the heater may be formed by evaporation or any other metal deposition process. Suitable metals for electrical resistive heating according to the present invention include but are not limited to chromium, titanium, aluminum, nickel, gold, platinum. Preferred are chromium, titanium, nickel, and gold.

There is no particular limitation on the size of the heater strip just so long as it doesn't succeed the dimensions of the over-all Y-branch, and just so long as it provides the localized heating necessary to achieve the objectives of the invention. However, preferably the heater length is 2–3 mm, the heater width is in the range of 3–30 micrometers, most preferably 5–15 micrometers, and the heater thickness is 0.05–1 micrometer, most preferably 0.1–0.5 micrometers.

In the practice of the present invention it has been found that electrical power levels of 10 to 100 mW per millimeter of heater length along the propagation direction are effective in causing switching in polymers characterized by dn/dT in the range of $-2$ to $-5 \times 10^{-4}/°$ C. Examples of such polymers include but are not limited to polyacrylates, polyfluoroacrylates, and polychloroacrylates. Power levels of 30 to 300 mW per millimeter of heater length along the propagation direction are found to be effective with polymers characterized by dn/dT in the range of $-0.5$ to $-2 \times 10^{-4}/°$ C. Examples of such polymers include but are not limited to polycarbonate and polymethylmethacrylate. In a typical embodiment of the present invention, the entire waveguide is made from the same polymeric system.

EXAMPLE

A Y-branch ND-DOS was designed and fabricated in thermo-optic polymer waveguides on a silicon wafer. The design of FIG. 2f was used for the fabrication. The output waveguide segment had a radius of curvature of 2 cm and a width of 7 μm. The exhaust waveguide segment had an essentially uniform width of 200 μm. The initial arm separation angle between the inner edges of the output and exhaust waveguide segments was 3.5°.

The composition designated B3 was prepared by combining 94% by weight of ethoxylated perfluoropolyether diacrylate (MW1100), 4% by weight of di-trimethylolpropane tetraacrylate, and 2% by weight of Darocur 1173, a photoinitiator available from Ciba-Geigy.

The composition designated BF3 was prepared by combining 98% by weight of ethoxylated perfluoropolyether diacrylate (MW1100) and 2% by weight of Darocur 1173.

The composition designated C3 was prepared by combining 91% by weight of ethoxylated perfluoropolyether diacrylate (MW1100), 6.5% by weight of di☐trimethylolpropane tetra-acrylate, 2% by weight of Darocur 1173, and 0.5% by weight of Darocur 4265 a different photoinitiator available from Ciba Geigy.

A 6-inch oxidized silicon wafer substrate was cleaned with KOH, then treated with (3-acryloxypropyl)trichlorosilane from Gelest. Polymer waveguides were formed on the central 5-inch area of the wafer so prepared using negative-tone photosensitive monomers in the following way: 2 ml of the BF-3 composition was deposited on the wafer which was then spun on a CEE-100 spin-coater (Brewer Scientific) at 1000 rpm for 13 seconds to form a 10-μm-thick BF3 underclad layer. The coated substrate so prepared was cured in a nitrogen atmosphere at 0.02 torr using 350 nm UV light (the Hg-i line) from a 1000 Watt mercury arc lamp A 7-μm-thick core layer of composition C3 was deposited in a similar manner to that employed for the previous layer. The ND-DOS Y-branch of the invention was patterned into the coating thereby formed by shining 350 nm UV light (the Hg-i line) from a 1000 Watt mercury arc lamp through a dark-field photomask then developing the unexposed region with ethyl acetate (HPLC grade, Fisher Scientific Co.). 3 ml of the B3 composition was placed on the patterned wafer and spin coated at 700 rpm for 14 sec. on the CEE-100 to form a 17 micrometer-thick B3 overclad layer. The coated layer so prepared was cured using the Hg-i line from the 1000 Watt mercury arc lamp in a nitrogen atmosphere at atmospheric pressure.

Heaters with a width of 8 μm, length of 2.44 mm, and thickness of 0.3 μm with lateral separation from the outside edge of the output side of transition segment of 29.5 μm were formed by sputter-depositing onto the polymer-coated wafer a layer of metallic nickel followed by a layer of metallic gold to form a two-layer heater stack. The heater stack so formed was patterned photolithographically using positive photoresist (Type 1808 available from Shipley) and a clear-field photomask followed by acid etching to form heaters and the base of interconnects/wire bonding pads. An electroplating base consisting of a layer of titanium followed by a layer of gold was sputter-deposited on top of the heater stack and a positive photoresist (Shipley SJR5740) applied thereto by spin-coating. UV-exposure with a dark-field photomask exposed the base of interconnects and wire bonding pads. Electroplating with gold was then performed. Finally the positive photoresist was developed and said electroplating base was acid etched, resulting in a wafer populated with chips having ND-DOS/VOAs. The chip so prepared had 8 ND-DOS/VOA devices of the same design with 250 μm center-to-center separation. All 8 ND-DOS/VOAs within the chip exhibited a digital switching behavior with >40 dB attenuation when no electrical power was applied. A transfer curve obtained experimentally for one of the 8 ND-DOS/VOAs is shown in FIG. 4, which exhibits an attenuation level better than 40 dB at zero heater electrical power, therefore demonstrating the ND feature. Note the 'digital' behavior, especially useful when the device is used as a ND-DOS, exhibited by the transmission being maximum and essentially constant above 70 mW applied heater electrical power. The thus fabricated ND-DOS/VOAs also exhibited little wavelength ($\square$) dependence.

The attenuation data obtained on the 8 ND-DOS/VOAs so fabricated is tabulated in Table 1, which shows that passive (passive=no electrical power) attenuation of >49.4 dB was obtained for all 8 devices. Variations in the fabrication process may have contributed to the observed attenuation, but the technique of measurement may well have contributed at least as much.

TABLE 1

| Channel Number on Chip | Passive Attenuation (dB) |
| --- | --- |
| 1 | 49.54 |
| 2 | 49.66 |
| 3 | 49.44 |
| 4 | 51.48 |
| 5 | 53.71 |
| 6 | 51.95 |
| 7 | 57.70 |
| 8 | 54.49 |

We claim:

1. A Y-branch normally dark digital optical switch or normally dark variable optical attenuator (ND-DOS/VOA) comprising an input waveguide segment, an output waveguide segment, an exhaust waveguide segment, a transition waveguide segment, a heater disposed proximate to said transition waveguide segment and said output waveguide segment;

said transition segment being disposed between said input waveguide segment, and said output and exhaust waveguide segments; said output waveguide segment and said exhaust waveguide segment being divergingly disposed with respect to said transition waveguide segment; said output waveguide segment being of a width and height that is within −50% to +100% of the width and height, respectively, of said input waveguide segment;

said transition waveguide segment being geometrically asymmetric with respect to the longitudinal axis of said input waveguide segment;

said exhaust waveguide segment and said output waveguide segment being characterized by a width ratio of at least 2:1;

wherein said input, output, exhaust, and transition waveguide segments comprise an organic polymer or silica; and with the proviso that said Y-branch ND-DOS/VOA further comprises a lateral displacement between said heating means and said output waveguide segment when said input, output, exhaust, and transition waveguide segments comprise an organic polymer.

2. The ND-DOS/VOA of claim 1 in the form of an ND-DOS.

3. The ND-DOS/VOA of claim 1 wherein said width ratio is at least 5:1.

4. The ND-DOS/VOA of claim 1 wherein said width ratio is at least 15:1.

5. The ND-DOS/VOA of claim 1 wherein said width ratio is at least 25:1.

6. The ND-DOS/VOA of claim 1 wherein the heater is an electrical resistance heater.

7. The ND-DOS/VOA of claim 1 comprising an organic polymer.

8. The ND-DOS/VOA of claim 1 further comprising a lateral shift of said transition waveguide segment with respect to said input waveguide segment of at least 3 times the width of said input waveguide segment at the output end thereof.

9. The ND-DOS/VOA of claim 7 wherein said lateral shift is at least ten times the width of said input waveguide segment at the output end thereof.

10. The ND-DOS/VOA of claim 1 wherein each of said waveguide segments comprise a core and a cladding, and wherein the refractive index of said core and cladding is uniform throughout said ND-DOS/VOA.

11. The ND-DOS/VOA of claim 1 wherein each of said waveguide segments comprise a core and a cladding, and wherein the refractive index of the core of said exhaust waveguide segment is higher than the refractive index of the core of said output waveguide segment.

12. The ND-DOS/VOA of claim 1 wherein said transition waveguide segment is characterized by a length of 1.5 to 2.5 millimeters.

13. The ND-DOS/VOA of claim 1 wherein said transition waveguide segment is characterized by a core width of 10 to 200 micrometers.

14. The ND-DOS/VOA of claim 1 wherein said exhaust waveguide segment is in the form of a parallelogram.

15. The ND-DOS/VOA of claim 1 wherein the width of said exhaust waveguide segment grows linearly and monotonically wider in the direction of propagation.

16. The ND-DOS/VOA of claim 1 wherein said exhaust waveguide segment is clipped in the transition waveguide segment.

17. The ND-DOS/VOA of claim 1 wherein said exhaust waveguide segment ends before the edge of the PLC chip on which it is mounted.

18. The ND-DOS/VOA of claim 17 further comprising an angled mirror at the termination of said exhaust waveguide.

19. The ND-DOS/VOA of claim 1 wherein said exhaust waveguide segment is characterized by curved sides.

20. The ND-DOS/VOA of claim 1 wherein said exhaust waveguide segment is in the form of the component waveguide segments and the heater that constitute the ND-DOS/VOA of the invention are smoothly curved.

* * * * *